US009979988B2

(12) United States Patent
Hao et al.

(10) Patent No.: US 9,979,988 B2
(45) Date of Patent: May 22, 2018

(54) PROGRAM DISTRIBUTION SERVICE

(71) Applicant: Verizon Patent and Licensing Inc., Arlington, VA (US)

(72) Inventors: Jianxiu Hao, Acton, MA (US); Xuefeng Yao, Weston, MA (US); Yuhui Qian, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 70 days.

(21) Appl. No.: 14/464,274

(22) Filed: Aug. 20, 2014

(65) Prior Publication Data
US 2016/0057460 A1 Feb. 25, 2016

(51) Int. Cl.
| | |
|---|---|
| H04N 7/18 | (2006.01) |
| H04N 21/2385 | (2011.01) |
| H04N 21/647 | (2011.01) |
| H04N 21/6405 | (2011.01) |
| H04N 21/6408 | (2011.01) |
| H04N 21/2665 | (2011.01) |
| H04N 21/472 | (2011.01) |
| H04N 21/41 | (2011.01) |
| H04N 21/61 | (2011.01) |

(52) U.S. Cl.
CPC ..... *H04N 21/2385* (2013.01); *H04N 21/2665* (2013.01); *H04N 21/4126* (2013.01); *H04N 21/47202* (2013.01); *H04N 21/47211* (2013.01); *H04N 21/6125* (2013.01); *H04N 21/6405* (2013.01); *H04N 21/6408* (2013.01); *H04N 21/64738* (2013.01); *H04N 21/64761* (2013.01)

(58) Field of Classification Search
CPC ......... H04N 21/2385; H04N 21/64738; H04N 21/6405; H04N 21/6408; H04N 21/2665; H04N 21/47202; H04N 21/47211; H04N 21/4126; H04N 21/6125; H04N 21/64761
See application file for complete search history.

(56) References Cited

U.S. PATENT DOCUMENTS

| | | | |
|---|---|---|---|
| 2004/0122975 A1* | 6/2004 | Lennestal | H04L 63/065 709/245 |
| 2009/0158162 A1* | 6/2009 | Imai | H04N 5/4403 715/734 |
| 2012/0084801 A1* | 4/2012 | Rowe et al. | 725/14 |
| 2013/0055301 A1* | 2/2013 | Hao et al. | 725/14 |

* cited by examiner

Primary Examiner — Yassin Alata

(57) ABSTRACT

A method, a device, and a non-transitory storage medium provide for receiving data that indicates programs available to users, wherein the programs include linear television programs, video-on-demand programs, and pay-per-view programs; determining, by the network device, a popularity value for each program; comparing, by the network device, each popularity value with a threshold popularity value; determining, by the network device, whether each popularity value satisfies the threshold popularity value; assigning, by the network device, each program associated with each popularity value that satisfies the threshold popularity value to multicast delivery based on the determining, wherein one or more programs assigned to multicast delivery include one or more of a video-on-demand program or a pay-per-view program; and multicasting each program assigned to multicast delivery.

20 Claims, 8 Drawing Sheets

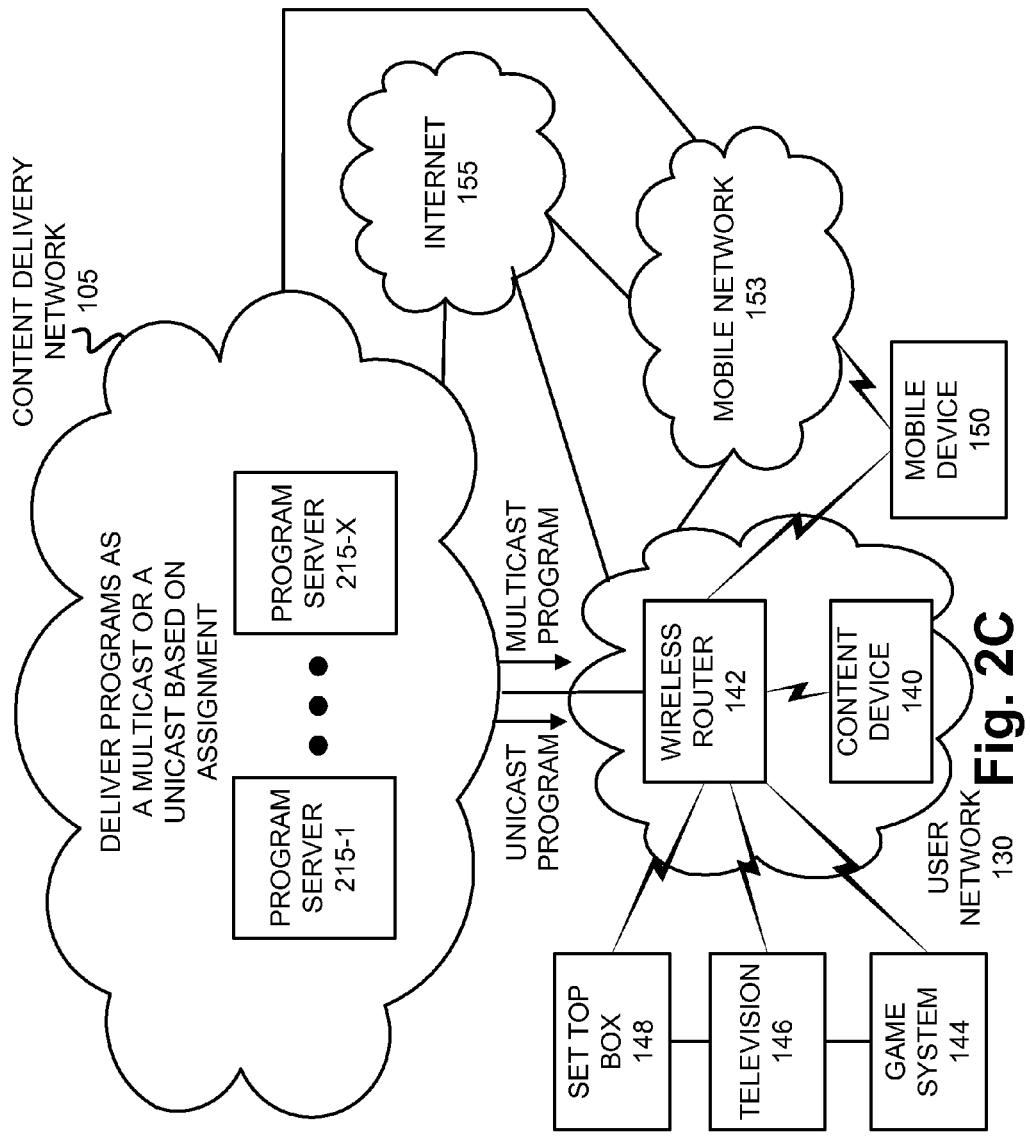

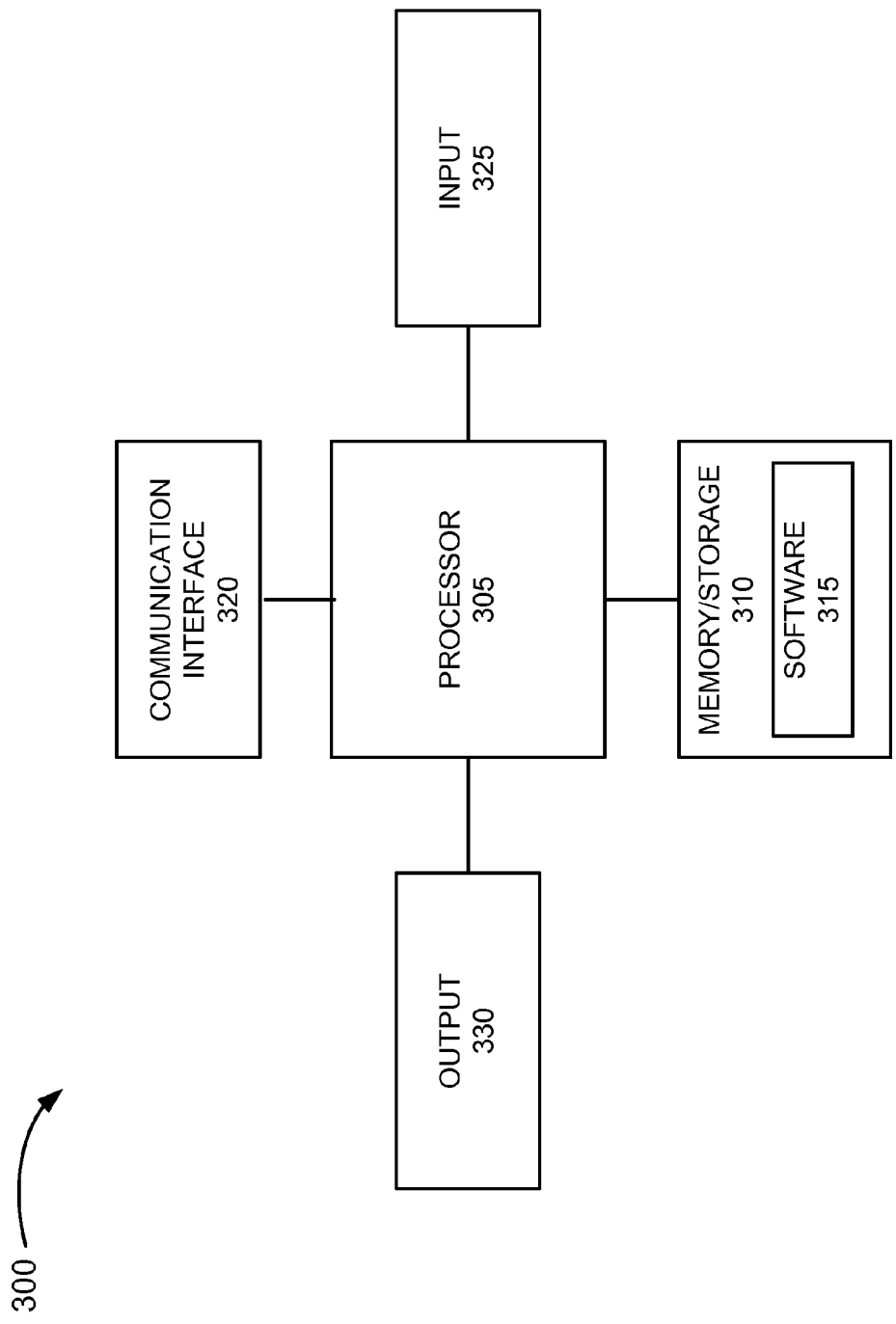

PROGRAM DISTRIBUTION SERVICE

BACKGROUND

Broadcasting and unicasting programs are popular delivery methods for providing programs to users. A content delivery network (CDN) (also known as a content distribution network) is used for broadcasting and unicasting the programs. The content delivery network, such as a television distribution network, stores the programs and delivers the programs to users either on-demand or according to a program schedule.

BRIEF DESCRIPTION OF THE DRAWINGS

FIGS. 2A-2E are diagrams that illustrate exemplary scenarios pertaining to the program distribution service;

FIG. 3 is a diagram illustrating exemplary components of a device that may correspond to one or more of the devices in an exemplary environment.

DETAILED DESCRIPTION OF PREFERRED EMBODIMENTS

Figure 1:
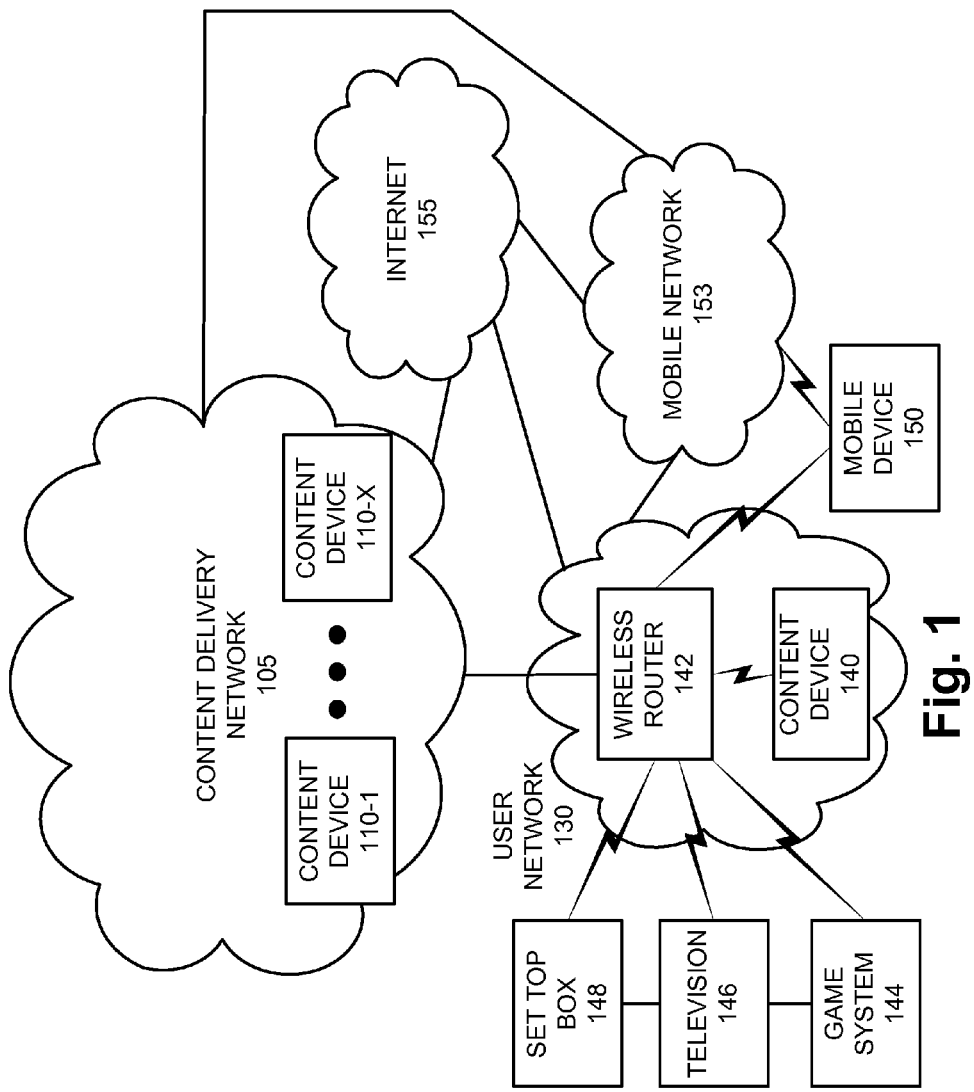
FIG. 1 is a diagram illustrating an exemplary environment in which an exemplary embodiment of a program distribution service may be implemented.

The following detailed description refers to the accompanying drawings. The same reference numbers in different drawings may identify the same or similar elements. Also, the following detailed description does not limit the invention.

As used herein, the term "program" refers to audio and/or visual content. For example, a program may include a linear television program (e.g., a movie, a program of a television series, a reality show, a documentary, etc.), an on-demand program, a pay-per-view program, music, a pre-recorded program, a live program, or user-generated content. A program may be free or may require some form of purchase (e.g., buy, rent, etc.).

A program service provider (e.g., a multiple system operator (MSO)) may offer a program service for programs. The program service may be a subscription-based program service that delivers programs to users. The program service provider delivers programs to users via a content delivery network. Depending on the program service provider, the content delivery network may have a national geographic presence, a regional geographic presence, or a local geographic presence. By way of further example, in a national-based context, the content delivery network may include a centralized center or distributed centers that receive programs and metadata from program providers, process the programs and metadata (e.g., transcode, format, encrypt, etc.), manage digital rights (e.g., licensing, etc.), and distribute the programs and metadata to regional centers. The regional centers make the programs and metadata available to users via local nodes, as well as perform other functions (e.g., user entitlement management, digital rights management, billing, program recommendations, etc.).

Typically, the program service provider unicasts video-on-demand programs and pay-per-view programs to users, and broadcasts linear television programs to users. Ideally, the choice of delivering programs via multicast or unicast is determined by the network efficiency and user experiences. As a comparative, one streaming server may serve, via multicasting, 300 channels and 10 million users using 1.5 Gbps of network capacity, whereas 10,000 streaming servers may be needed to serve, via unicasting, 300 channels using 50 Tbps of network capacity.

The program service provider, however, is faced with various problems in providing the program service to users. For example, according to the example above, the program service provider is faced with enormous cost considerations when implementing an infrastructure that supports users on a national scale. Additionally, the program service provider wants to have an infrastructure that meets quality-of-service (QoS) standards (e.g., in terms of speed of delivery, availability of programs, etc.) such that users are satisfied with the program service.

According to an exemplary embodiment, programs are assigned to a unicast delivery system, a multicast delivery system, or both. The assignment of the programs includes the allotment of channels to each delivery system. According to an exemplary embodiment, the assignment includes sorting the programs by popularity. The sorting of the programs may include other factors, such as date and time, geographic region of users, etc. Based on the sorting, the most popular programs are assigned to multicast delivery. The most popular programs may also be assigned to other delivery systems (e.g., unicast, public Internet, etc.). According to an exemplary embodiment, the most popular programs include programs that conventionally are not delivered via multicast. As an example, the most popular programs may include video-on-demand programs, pay-per-view programs, as well as linear television programs and/or other types of programs. The remaining programs are assigned to unicast delivery and/or public Internet delivery. According to another embodiment, in addition to popularity, the programs are sorted based on a partitioning of the content delivery network. For example, a content delivery network may be partitioned based on certain types of nodes (e.g., video home offices, video serving offices, cells of a wireless network, etc.).

According to an exemplary embodiment, user devices allow the users to select the delivery method for a program. For example, if the program is a popular program, the user may have the option between multicast delivery and unicast delivery.

According to exemplary embodiment, when the programs are delivered via a multicast delivery system, if there are any errors in the program data received by the user device, the user device connects to a program server and receives, via unicast delivery, an error-free portion of the program data.

According to an exemplary embodiment, programs are multicasted to user devices according to a multicast schedule and programs are unicasted to user devices according to a unicast schedule. For example, the multicast schedule and the unicast schedule may take the form of a guide (e.g., an electronic program guide (EPG), an interactive program guide (IPG), etc.) or other form of user interface. Since programs, which are multicasted, include video-on-demand programs, pay-per-view programs, etc., the user loses some flexibility to view these programs. However, to maximize user flexibility, programs may be multicasted and stored by the user device. Once the program is stored successfully, the user device notifies the user that the program is ready for viewing. The user has the option to view the program at that time or at a later time. For example, a new movie may be designated as popular. The content delivery network multicasts the program during off-peak hours (e.g., midnight) when the network is not busy. During the receipt and storage of the new movie, the user device determines if there are any errors in the program data, and if so, retrieves corrected portions of the program data via a unicast delivery system (e.g., from a program server). The next day, the user wakes up and checks the status of the new movie. The user device indicates to the user, via a user interface, that the new movie is available for viewing.

According to an exemplary embodiment, a user network includes an in-home media device located at a user's home. The content delivery network multicasts programs to the in-home media device. The in-home media device stores the programs and metadata and makes the programs and metadata available to the user. The in-home media device also determines if there are any errors in the program data, and if so, retrieves corrected portions of the program data via a unicast delivery system (e.g., from a program server). Once the program data is received successfully, the in-home media device notifies the user that the program is ready for viewing. The users have the option to view the programs at that time or at a later time. For example, the user may download or stream in a uncast manner, via the user device, the program from the in-home media device. The in-home media device may also share stored programs with other users of the program distribution service.

FIG. 1 is a diagram illustrating an exemplary environment in which an exemplary embodiment of a program distribution service may be implemented. As illustrated, environment 100 includes a content delivery network 105, which includes content devices 110-1 through 110-X (also referred to collectively as content devices 110 and individually or generally as content device 110). As further illustrated, environment 100 includes a user network 130. User network 130 includes a content device 140 and a wireless router 142. Environment 100 also includes exemplary user devices, such as a game system 144, a television 146, a set top box 148, and a mobile device 150.

Environment 100 may be implemented to include wired, optical, and/or wireless connections among the devices and the network illustrated. A connection may be direct or indirect and may involve an intermediary device and/or an intermediary network not illustrated in FIG. 1. Additionally, the number, type (e.g., wired and wireless), and the arrangement of connections between the devices and the networks are exemplary.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

The number of devices, the number of networks, and the configuration in environment 100 are exemplary. According to other embodiments, environment 100 may include additional devices, fewer devices, and/or differently arranged devices, than those illustrated in FIG. 1. For example, a single device in FIG. 1 may be implemented as multiple devices and/or multiple devices may be implemented as a single device. By way of further example, content device 140 may be implemented as multiple devices, such as a computer and an external storage device, and/or set top box 148 and television 146 may be combined into a single device. Additionally, for example, content device 140 and wireless router 142 may be combined into a single device.

Additionally, or alternatively, environment 100 may include additional networks and/or differently arranged networks, than those illustrated in FIG. 1. For example, environment 100 may include an intermediary network. The types of devices and the types of networks in environment 100 are also exemplary. Also, according to other embodiments, one or more functions and/or processes described as being performed by a particular device may be performed by a different device, or some combination of devices.

Content delivery network 105 includes a network that provides access to and use of a program distribution service. Generally, content delivery network 105 may be implemented as a satellite-based network, a terrestrial-based network, or a combination thereof. Content delivery network 105 may be implemented to distribute programs using various technologies, such as an optical architecture, a coaxial cable architecture, an Internet Protocol (IP) TV architecture, a digital subscriber line (DSL) architecture, a wireless architecture, and/or an Internet-based architecture. Depending on the architecture implemented, content delivery network 105 may include various types of network devices that contribute to the provisioning and distribution of the program service.

Content devices 110 include network devices that provide the program distribution service. According to an exemplary embodiment, content devices 110 include a content management system that determines the popularity of programs and assigns a method of delivery for each program, including multicast and unicast, based on the determination of popularity and/or one or more other factors. As previously described, contrary to conventional approaches, programs (e.g., video-on-demand, pay-per-view, etc.) that are normally delivered in a unicast manner, are assigned to multicast delivery. For example, a video-on-demand program or a pay-per-view movie may be a new movie or other special event. Depending on the program, the content management system may use different factors to determine the popularity of a program. For example, some programs may have historical data that indicates a degree of popularity based on previous user viewership data. Other programs may not have historical data that indicates the degree of popularity. According to such instances, content management system predicts the popularity of a program based on correlations with other similar programs. The similarity between programs can be based on various factors, such as, genre, storyline or plot, lead actor, supporting actor, director, film scorer, musical score, movie picture rating (e.g., R, PG-13), title, etc. The content management system uses other factors to determine a degree of popularity, such as demographic data pertaining to the geographic region to which the program is made available. For example, the demographic data includes age, gender, education, income, marital status, etc. of the users.

The content management system assigns a popularity ranking (e.g., popularity values) for the programs based on the various data described. Depending on the available network resources (e.g., bandwidth available, number of channels available, network devices, links, etc.) and administrative configurations to use the available network resources, the content management system selects the programs that are to be multicasted and the programs that are to be unicasted.

Content devices 110 also include network devices that provide various program services, such as a program processing device (e.g., transcoding, encryption, etc.), a digital rights management device, a licensing device, a login device (e.g., authentication, authorization, etc.), a program storage device, a metadata storage device, and a program server device. The program server device multicasts and/or unicasts programs to the users. Content devices 110 may include other types of network devices, such as a billing device, a program recommendation device, a user account management device, etc.

User network 130 includes a network that provides access to and use of an extended CDN device, such as content device 140. According to an exemplary embodiment, user network 130 is located in a user's home, a place of business, or other similar locale. Content device 140 includes a device that communicates with content devices 110, stores programs, and disburses a program to other user devices (e.g., game system 144, television 146, etc.) by way of streaming and/or downloading. For example, content device 140 may be a user's computer (e.g., a desktop computer) or some other suitable computational device. By way of further example, content device 140 may be an in-home media device. The in-home media device may provide program services for multiple user devices (e.g., set top box 148, etc.). According to such an implementation, the user installs software on the computer to allow the computer to provide extended CDN functions, as described herein. The software may include a wizard setup that, among other things, provides for an on-boarding process with content device 110. The on-boarding process may include authenticating content device 140, assigning content device 140 with an extended CDN identifier, which uniquely identifies content device 140 and indicates content device 140 as an extended CDN device, and identifying a location (e.g., state, city, zip code, and street address; longitude and latitude coordinates; etc.) of content device 140. Content device 140 may also provide its network address (e.g., a public IP address). The on-boarding information (e.g., CDN identifier, location, etc.) may be stored in one more devices in CDN 105, such as content device 110. For example, as previously described, content devices 110 include program servers that multicast and unicast programs for a geographic region.

According to other implementations, the program service provider may provide the user with a computational device (e.g., content device 140). For example, the computational device may include pre-installed software that provides the functionality of content device 140. This hardware-based solution may also offer other functionalities. For example, the computational device may, in addition to the functionalities described above, include a router that offers a wireless service. For example, the computational device may include a wireless access technology (e.g., WiFi, Bluetooth, etc.) so that the computational device can form a local network with other devices.

Subsequent to the on-boarding process, content device 140 can receive programs from content device 110 via multicast and unicast deliveries. The receipt of programs by content device 140 may be user-initiated (e.g., selected by the user). Additionally, receipt of programs by content device 140 may be initiated by content device 110. For example, content device 110 may deliver to and store programs on (e.g., based on a program recommendation service) content device 140 that are deemed of interest to the user, others in the user's household, or even neighbors of the user to which sharing of programs using the program distribution service and extended content delivery service may exist. Content device 140 also determines if there are any errors in the program data, and if so, obtains a corrected portion of the program data via a unicast method with a program server device. As an example, if content device 140 receives a program via a multicast and a program segment includes an error, which cannot be corrected (e.g., using an error correction technique), content device 140 establishes a unicast session with another program server (e.g., content device 110) to obtain an error-free program segment.

Content device 140 can provide downloading and streaming services to user devices (e.g., game system 144, etc.). Content device 140 provides a user interface that allows the user to manage the programs stored. For example, the user interface allows the user to delete a program, schedule the downloading and streaming of a program from content device 110, schedule for content device 140 to receive a program via a multicast or a unicast from content device 110, etc. The user interface may also include a pseudo storefront that allows a user wishing to download or stream a program, to see what programs are stored on and available from content device 140. Additionally, the user interface may allow the user to schedule the user device to receive and store a program from a multicast provided by content delivery network 110.

Wireless router 142 includes a device that provides routing capabilities. For example, wireless router 142 may be implemented as an in-home router device, a broadband router, or a wireless router. Game system 144 includes a device that plays video games. For example, game system 144 may be implemented as a video game console, such as a PlayStation, an X-box, a Wii, etc., gaming system. Game system 144 may also be implemented as a handheld gaming device, which may include a display. Game system 144 may include wireless capabilities. Television 146 may be implemented as a non-smart television, a smart television, or some other form of a display device. Television 146 may include wireless capabilities. Set top box 148 may be implemented as a client device, a thin client device, a converter box, a receiver device, a tuner device, a digibox, an IPTV set top box, or some combination thereof. Set top box 148 may include wireless capabilities. Mobile device 150 may be implemented as a smartphone, a tablet device, a computer (e.g., a laptop computer, a netbook, a palmtop computer, etc.), or some other type of end user device (e.g., an Internet access device, glasses, etc.).

According to an exemplary embodiment, the exemplary user devices (e.g., game system 144, set top box 148, television 146, and mobile device 150) each include software (e.g., a client application) that allows the user devices to communicate with content device 140 and download and/or stream a program from content device 140. In some embodiments, the exemplary user devices can also receive multicast and unicast deliveries of programs directly from content devices 110 (i.e., without utilizing content device 140). Additionally, content device 140 may include multiple set top boxes (e.g., tuners).

Mobile network 153 includes a wireless network. For example, mobile network 153 may be implemented as a Long Term Evolution (LTE) network, a Code Division Multiple Access (CDMA) network, a Universal Mobile Telecommunications System (UMTS) network, a Global System for Mobile Communications (GSM) network, a Wideband Code Division Multiple Access (WCDMA) network, a High-Speed Packet Access (HSPA) network, an Evolution Data Optimized (EV-DO) network, and/or another type of wireless network (e.g., an LTE Advanced network, or future generation wireless network architecture). Internet 155 is the Internet.

Figure 2A:
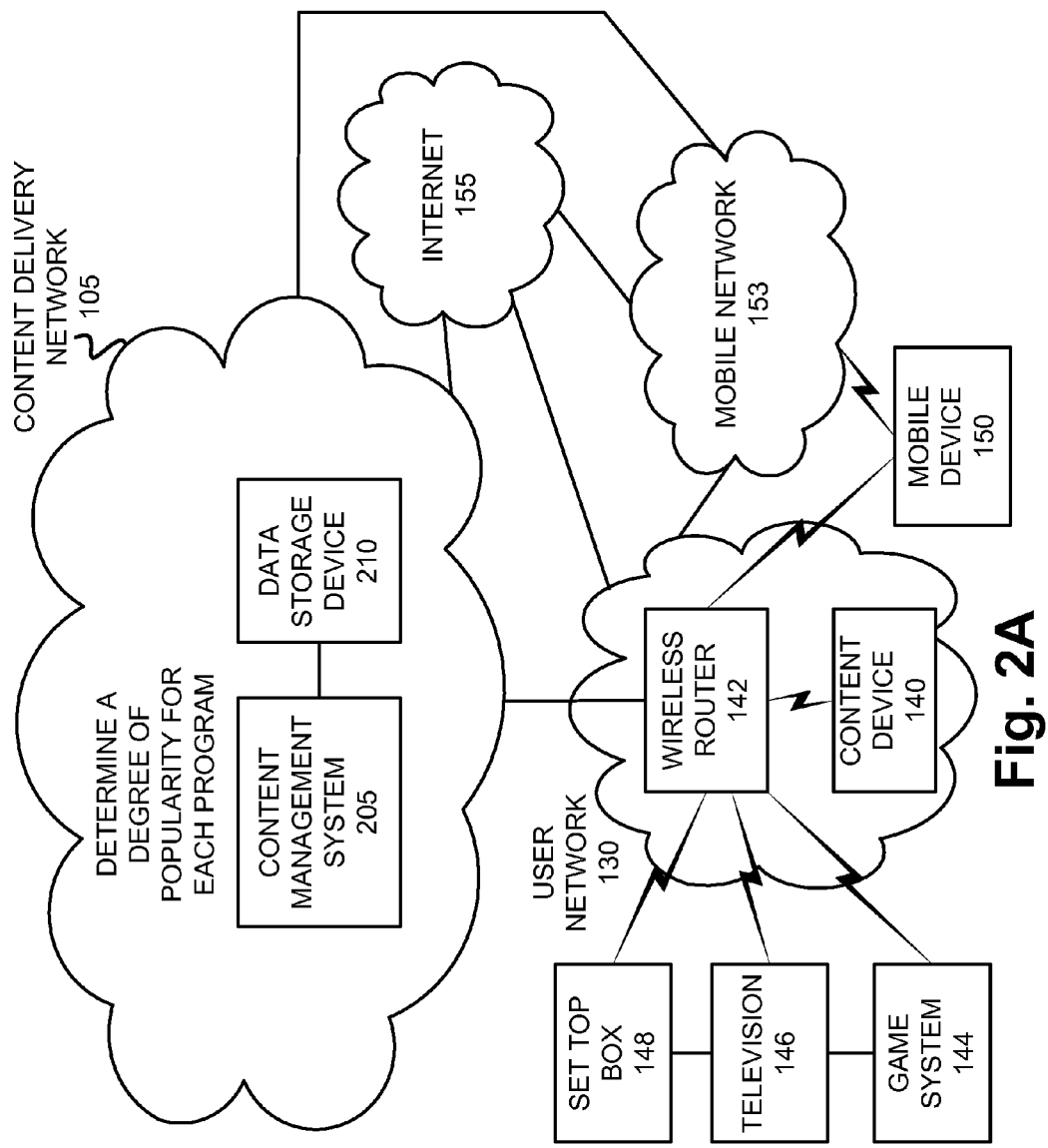

FIGS. 2A-2E are diagrams illustrating exemplary scenarios pertaining to an exemplary embodiment of the program distribution service. As illustrated in FIG. 2A, content delivery network 105 includes a content management system 205 and a data storage device 210. Content management system 205 and data storage device 210 are network elements of content devices 110, as previously illustrated and described in relation to FIG. 1.

Content management system 205 determines the popularity of programs and assigns a method of delivery for each program, including multicast and unicast, based on the determination of popularity. For example, content management system 205 uses data stored in data storage device 210 to determine the popularity and to assign the method of delivery for each program, as described herein.

Data storage device 210 stores data pertaining to the program distribution service. For example, data storage device 210 stores metadata pertaining to the programs, such as title, genre, length of time of a program, format (e.g., high definition, 3D, etc.), etc. Data storage device 210 also stores a program guide that provides a schedule for program deliveries. For example, the schedule may indicate dates, days, and times for programs to be delivered or made available to users. The schedule may also be geographic-specific. For example, for a national-based program service provider, the scheduling of programs may differ depending on where in the United States the users are located. The program guide may include various types of programs, such as linear television programs, video-on-demand programs, pay-per-view programs, as well as other types of programs (e.g., user content, etc.).

Data storage device 210 stores network resource data. For example, the network resource data indicates the amount of bandwidth allocated for multicast channels and unicast channels, the number of multicast channels and unicast channels, the number and capabilities of program servers and links, geographic data pertaining to the network resources, etc. The network resource data may pertain to one or multiple networks. For example, referring to FIG. 2A, the network resource data may pertain to content delivery network 105 and mobile network 153. As an example, the program service provider may offer a television service, a mobile service, and an Internet service. The program service provider may use these available network resources to distribute programs to its users. For example, assume that mobile network 153 is an LTE network. The LTE network may support both unicast and multicast deliveries of programs. Additionally, in the event that certain geographic regions are not covered by the content delivery network 105 and mobile network 153, the program service provider may distribute programs to users via Internet 155. For example, programs may be unicasted to users via Internet 155. Additionally, as previously described, user network 130 provides for the distribution of programs to users. For example, content device 140 may store programs received from content delivery network 105 and distribute the programs to users of user network 130 and users of other user networks 130 (e.g., a program sharing service). By way of further example, content device 140 may download or stream to user devices associated with users belonging to another user network 130 and/or store programs to another content device 140 of another user network 130.

Data storage device 210 stores other types of data that can be used by content management system 205 to determine the popularity of programs and/or the method of delivery. For example, data storage device 210 stores user viewership data. The user viewership data may pertain to users' previous viewing of the program. Additionally, the user viewership data may pertain to users' previous viewing of a similar program relative to another program. For example, a television series includes various episodes in which each episode is considered a program. In this regard, the users' previous viewing of other episodes can be used to determine popularity of a new episode or any episode that is scheduled. The user viewership data may pertain to user viewership via the program service. Additionally, the user viewership data may include data based on other venues in which users viewed a program. For example, the user viewership data may include data based on revenue generated by a program (e.g., a movie) at the box office, etc. Data storage device 210 may also store demographic data pertaining to users, as previously described.

Data storage device 210 stores prediction data that indicates a probability of popularity (e.g., between 0 and 1) or a popularity value (e.g., between 0 and 100), which indicates a degree of popularity. As an example, a new program may offer little in terms of historical data. Data storage device 210 may store a probability of popularity or a popularity value for another program, which can be used in determining popularity for the new program. The probability of popularity or the popularity value may be derived based on analyzing and identifying similarities and/or dissimilarities between the new program and one or multiple other programs. For example, content management system 205 may identify similarities and/or dissimilarities between programs based on program metadata associated with each program. In addition, prediction data may include the amount of television advertisement leading up to the new program, Internet advertisement, social media attention, and other venues (e.g., billboards, etc.) that would provide an indication of the probability of popularity or from which a popularity value could be calculated.

Referring to FIG. 2A, content management system 205 uses the data stored in data storage device 210 to calculate a degree of popularity for each program. For example, content management system 205 uses the program schedule to select programs for which a degree of popularity is to be determined. Depending on the program, content management system 205 may use viewership data, demographic data, a probability of popularity or a popularity value associated with another program, metadata associated with the program, and/or metadata associated with other programs. Content management system 205 also considers the date, day and/or time the program is scheduled. For example, a program that is scheduled for 7:00 a.m., on a Sunday, may have a lower popularity at least by virtue of this day and time slot, relative to another program that is scheduled at 9:00 p.m., on a Friday. According to an exemplary implementation, content management system 205 uses a weighted equation to calculate a degree of popularity. The weighted equation includes variables corresponding to the user viewership data, etc, as well as scalars are weighted values for the variables. As previously mentioned, the degree of popularity may be expressed, for example, as a numeric value. A probability of popularity may be mapped to a popularity value.

Content management system 205 calculates a degree of popularity for each program that is scheduled within a certain time window. In some cases, the same program may be available on different days and/or times. Content management system 205 may streamline the calculation of the degree of popularity for the same program by merely considering the scheduling data and determining an impact on popularity that may have. For example, if the program is scheduled mid-afternoon and very late at night, content management system 205 may decrease the degree of popularity of the program scheduled late at night relative to the degree of popularity of the program scheduled mid-afternoon. Content management system 205 may use various difference values, which may be calculated based on historical viewership data, to increase or decrease the degree of popularity.

Figure 2B:
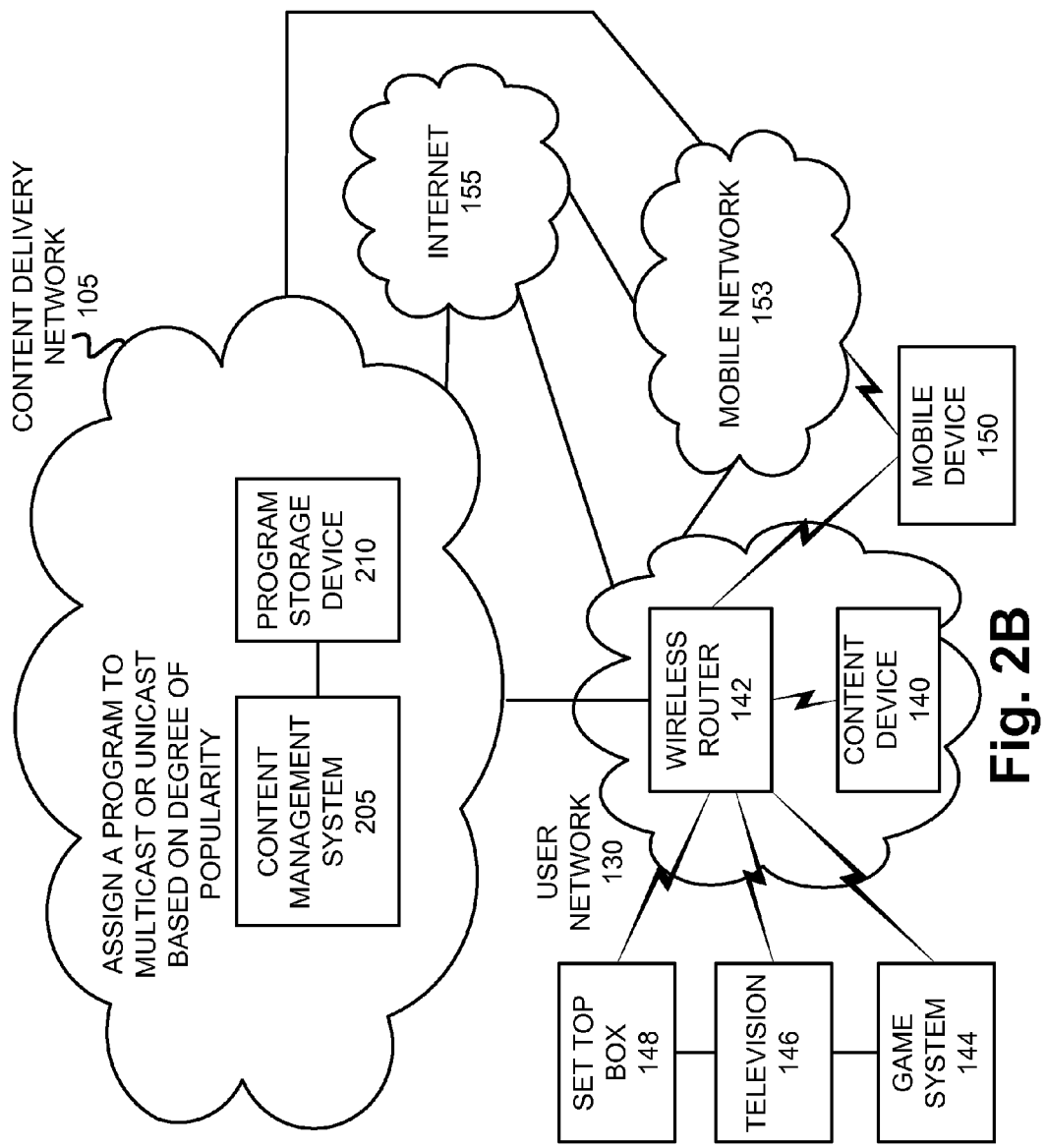

Referring to FIG. 2B, content management system 205 assigns a program to multicast delivery or unicast delivery based on the calculated degree of popularity. According to an exemplary embodiment, content management system 205 uses a threshold popularity value as a determinate to assign a program to delivery method. For example, if the popularity value of a program is equal to or exceeds the threshold popularity value, content management system 205 assigns the program to multicast delivery. Otherwise, if the popularity value of the program is below the threshold popularity value, content management system 205 assigns the program to unicast delivery. As previously described, programs that are assigned to multicast delivery may also be available for unicast delivery.

Since network resources are limited, content management system 205 evaluates the delivery assignments based on network resource data. In the event that the network resources are unable to support the assigned deliveries, content management system 205 may adjust the delivery assignments. For example, a program originally assigned to unicast delivery may be reassigned to multicast delivery where a particular geographic area has limited network resources. As previously described, the assignment of delivery may span one or multiple networks (e.g., content delivery network 105, mobile network 153, Internet 155). Additionally, a program may be assigned more than one method of delivery.

Referring to FIG. 2C, in accordance with the program schedule and the assignment of delivery for the programs, program servers 215-1 through 215-X (also referred to collectively as program servers 215) multicast and unicast programs to users. For example, content management system 205 may provide assignment information to program servers 215. For example, a program may be multicasted via user network 130 and/or mobile network 153, or the program may be unicasted via user network 130, mobile network 153, and/or Internet 155. Various user devices (e.g., game system 144, television 146, set top box 148, mobile device 150) receive the programs via these delivery methods. Additionally, as previously described, the user of a user device may have an option as to the delivery method when a program is assigned multiple delivery methods (e.g., unicast and multicast).

Figure 2D:
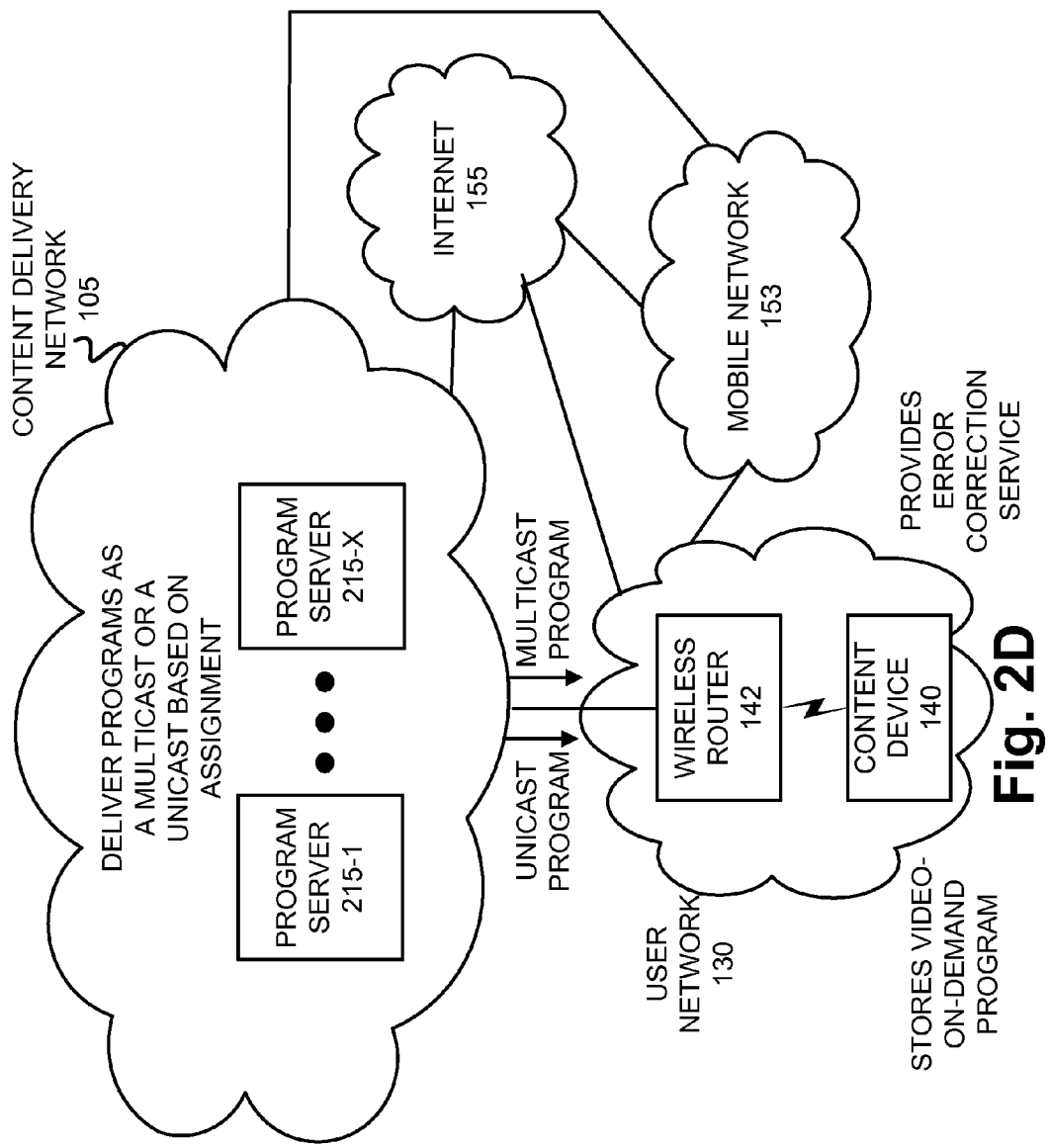
Figure 2E:
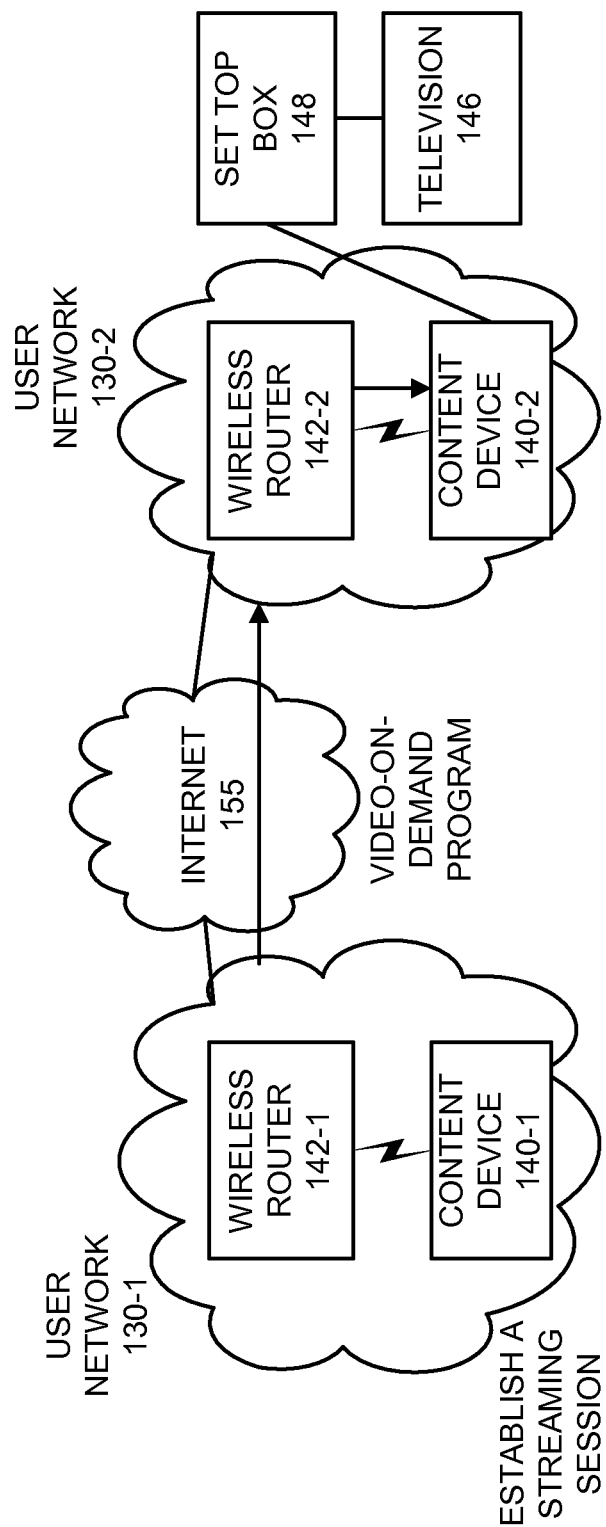

Referring to FIG. 2D, the program distribution service also provides for programs to be stored on content device 140. According to this exemplary use case, assume the user (not illustrated) operates set top box 148 and chooses to record a video-on-demand program via a multicast. After user authentication is successfully completed, content device 140 identifies the scheduled multicast of the video-on-demand program. When the video-on-demand program begins, content device 140 may save program chunks from a multicast data channel. Additionally, as previously described, content device 140 provides an error correction service that determines that a program chunk contains an error that cannot be self-corrected (e.g., by content device 140 using forward error correction) and obtains a replacement (e.g., an error-free program chunk) from a program unicast service (e.g., provided by one of program servers 215).

Content device 140 notifies a user of user network 130 (or a user of another user network 130 in the case of a program sharing situation) that the video-on-demand program is available for viewing. Content device 140 may transmit the notification to a user device after a portion of the video-on-demand program is stored, or after the entire video-on-demand program has been stored. Subsequent to receiving the notification, the user has the option to view the video-on-demand program at that time or at a later time. The user may download or stream the video-on-demand program from content device 140 via a user device (not illustrated), such as game system 144, television 146, set top box 148, or mobile device 150. The user device may obtain a content decryption key from a license server (e.g., content device 110) before the video-on-demand program can be viewed.

Additionally, as previously described, the program distribution service includes a program sharing service that allows users of different user networks 130 to share programs that are stored on content device 140. For example, referring to FIG. 2E, a user (not illustrated) of user network 130-2 may view the video-on-demand program that was multicasted to content device 140-1 of user network 130-1. As an example, content device 140-1 may notify the user that the video-on-demand program is available. In response, the user initiates a streaming session with content device 140-1 via television 146 and set top box 148. Content device 140-1 streams the video-on-demand program via Internet 155. The video-on-demand program may be stored on content device 140-2 of user network 130-2. According to an exemplary implementation, a client application of set top box 148 may obtain license and encryption keys from content device 110 pertaining to the video-on-demand program. In this way, control of licensing and digital rights management may still remain with the program service provider. Thereafter, the user may view the video-on-demand program.

In community-based extended CDNs, as described above, having a user obtain a program from his/her own content device 140 or another user's content device 140, for example, can reduce congestion in CDN 105. Additionally, for example, the user may have a better viewing experience, during high traffic conditions, using user network 130 than using content device 110 of CDN 105.

Although FIGS. 2A-2E illustrate exemplary processes associated with the program distribution service, according to other scenarios, other types of processes may be performed.

FIG. 3 is a diagram illustrating exemplary components of a device 300 that may correspond to one or more of the devices in the environments described herein. For example, device 300 may correspond to content device 110, content device 140, mobile device 150, as well as other devices illustrated and described. As illustrated in FIG. 3, according to an exemplary embodiment, device 300 includes a processor 305, memory/storage 310 that stores software 315, a communication interface 320, an input 325, and an output 330. According to other embodiments, device 300 may include fewer components, additional components, different components, and/or a different arrangement of components than those illustrated in FIG. 3 and described herein.

Processor 305 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., cache, etc.), etc.

Processor 305 may control the overall operation or a portion of operation(s) performed by device 300. Processor 305 may perform one or multiple operations based on an operating system and/or various applications or computer programs (e.g., software 315). Processor 305 may access instructions from memory/storage 310, from other components of device 300, and/or from a source external to device 300 (e.g., a network, another device, etc.).

Memory/storage 310 includes one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 310 may include a hard disk (e.g., a magnetic disk, an optical disk, a magneto-optic disk, a solid state disk, etc.) and a corresponding drive. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 includes an application or a program that provides a function and/or a process. In this context, the term "program" is used in the sense of a sequence of instructions designed for execution on a computer system. A "program" or a "computer program" may include a subroutine, a function, a procedure, an object method, an object implementation, an applet, a servlet, a source code, an object code, a shared library/dynamic load library and/or other sequence of instructions designed for execution on a computer system. The term "program," when used to mean, for example, audio and/or video data versus used to mean a set of instructions will be apparent from the context of use in the present document. As an example, with reference to content device 110, software 315 may include an application that, when executed by processor 305, provides the functions of the program distribution service, as described herein. Additionally, for example, with reference to content device 140, software 315 may include an application that, when executed by processor 305, provides the functions of the extended CDN service and the error correction service, as described herein. Additionally, with reference to user devices (e.g., set top box 148, television 146, game system 144, and mobile device 150), software 315 may include an application that, when executed by processor 305, provides the functions of a client, as described herein. Software 315 may include firmware.

Communication interface 320 permits device 300 to communicate with other devices, networks, systems, and/or the like. Communication interface 320 includes one or multiple wireless interfaces and/or wired interfaces. For example, communication interface 320 may include one or multiple transmitters and receivers or transceivers. Communication interface 320 may operate according to a protocol stack and a communication standard.

Input 325 permits an input into device 300. For example, input 325 may include a keyboard, a mouse, a display, a touchscreen, a touchless screen, a button, a switch, an input port, speech recognition logic, and/or some other type of visual, auditory, tactile, etc., input component. Output 330 permits an output from device 300. For example, output 330 may include a speaker, a display, a touchscreen, a touchless screen, a light, an output port, and/or some other type of visual, auditory, tactile, etc., output component.

Device 300 may perform a process and/or a function, as described herein, in response to processor 305 executing software 315 stored by memory/storage 310. By way of example, instructions may be read into memory/storage 310 from another memory/storage 310 (not shown) or read from another device (not shown) via communication interface 320. The instructions stored by memory/storage 310 causes processor 305 to perform a process described herein. Alternatively, for example, according to other implementations, device 300 performs a process described herein based on the execution of hardware (processor 305, etc.).

Figure 4:
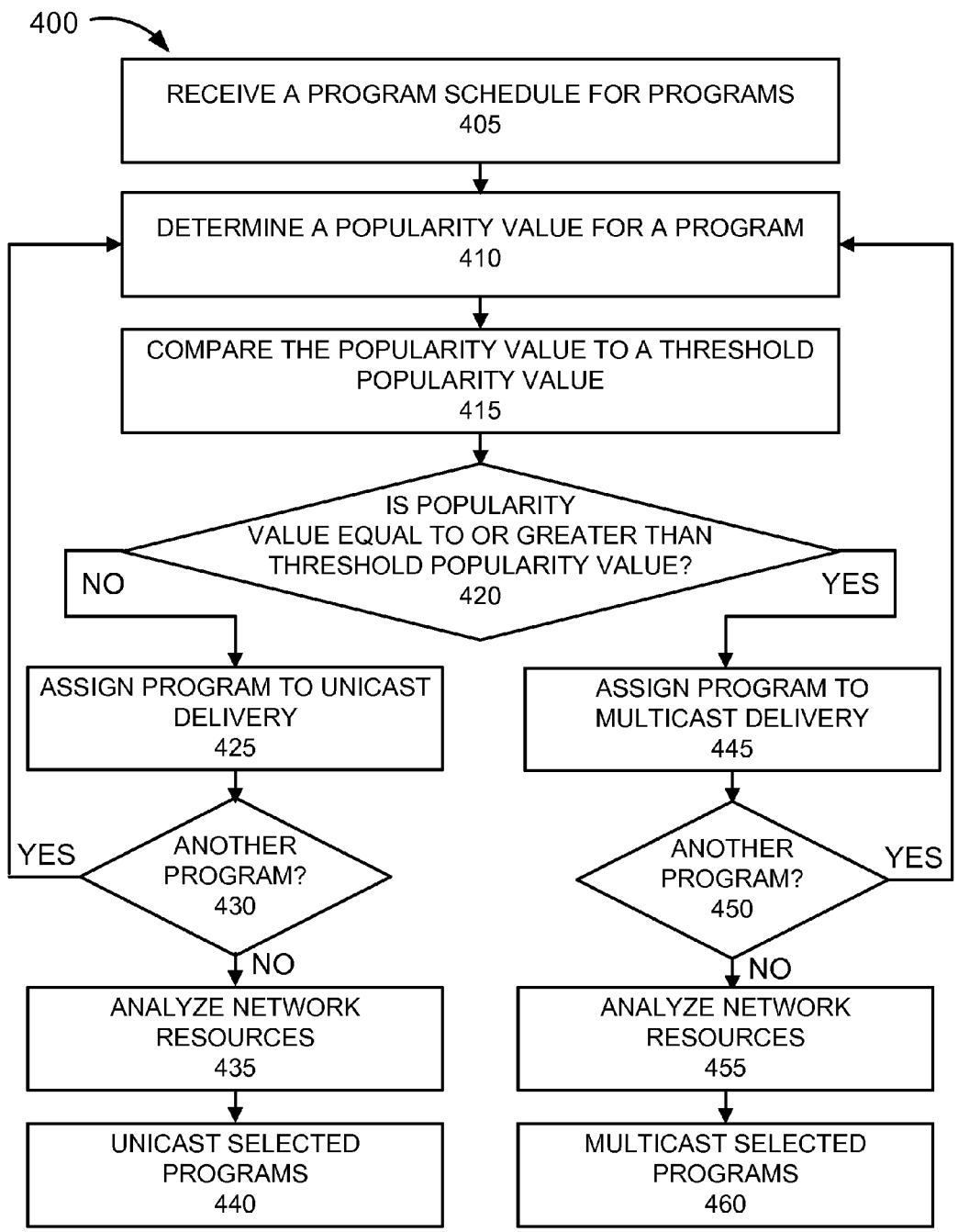
FIG. 4 is a flow diagram that illustrates an exemplary process pertaining to the program distribution service.

FIG. 4 is a flow diagram illustrating an exemplary process 400 pertaining to the program distribution service. Process 400 is directed to a process previously described above with respect to FIGS. 2A-2C and elsewhere in this description, in which content device 110 assigns a delivery method for a program based on its popularity. As previously described, various types of programs, such as linear television programs, and video-on-demand programs, pay-per-view programs, etc., may be multicasted to users based on their degree of popularity. This is in contract to conventional approaches in which video-on-demand programs and pay-per-view programs are unicasted to users. According to an exemplary embodiment, content device 110 performs one or more of the steps described in process 400. For example, processor 305 executes software 315 to perform the steps described.

Referring to FIG. 4, block 405, process 400 begins in which a program schedule for programs is received. For example, content management system 205 obtains a program schedule for programs from data storage device 210. The program schedule provides date, day, and time information pertaining to programs that are to be provided or made available to users. The program schedule may be geographic-specific (e.g., a certain locale of the United States, etc.). Content management system 205 also obtains program metadata.

In block 410, a popularity value for a program is determined. For example, content management system 205 selects a program from the program schedule and determines the popularity value for the program. As previously described, content management system 205 may use various data to determine the popularity of the program, such as user viewership data, prediction data, program metadata, and demographic data. Content management system 205 may also consider the date, day, and time the program is scheduled. As previously described, content management system 205 may use a weighted equation to calculate the popularity value for the program.

In block 415, the popularity value is compared to a threshold popularity value. For example, content management system 205 stores a threshold popularity value. The threshold popularity value may be configured by an administrator of the program distribution service. According to an exemplary embodiment, the threshold popularity value represents a threshold of popularity that, if met, indicates that the program is to be delivered to users as a multicast. Conversely, if the popularity value does not satisfy the threshold popularity value, the program is to be delivered to users as a unicast. In block 420, it is determined whether the popularity value is equal to or greater than the threshold popularity value. For example, content management system 205 determines whether the popularity value satisfies the threshold popularity value based on the comparison. If it is determined that the popularity value is not equal to or greater than the threshold popularity value (block 420—NO), then the program is assigned to unicast delivery (block 425). For example, content management system 205 assigns the program to unicast delivery for users.

In block 430, it is determined whether there is another program. For example, content management system 205 determines whether another program in the program schedule needs to be evaluated for popularity and assigned a delivery method. If it is determined that there is another program (block 430—YES), then process 400 continues to block 410. If it is determined that there is not another program (block 430—NO), then network resources are analyzed (block 435). For example, content management system 205 determines whether there are sufficient network resources to unicast the selected programs. For example, content management system 205 analyzes the network resource data. The network resource data may be network-specific. For example, the network resource data may pertain to content delivery network 105. In the event that there are not sufficient network resources to support the unicast of one or multiple programs, content management network 205 may select another network to unicast the program, such as mobile network 153 or Internet 155. Depending on the outcome of the analysis, in a degenerative case, content management network 205 may, ad hoc, reassign the most popular, unicast program(s) to be multicasted when there are insufficient network resources to unicast the program and there are sufficient network resources to multicast the program. Alternatively, content management network 205 requests a change in the program schedule. A program scheduler may change the program schedule so that sufficient network resources are available to accommodate the unicasting of the selected programs during a particular time period.

In block 440, the selected programs are unicasted. For example, content devices (e.g., program servers 215) unicast the selected programs. The programs are unicasted based on the program schedule.

Referring back to block 420, if it is determined that the popularity value is equal to or greater than the threshold popularity value (block 420—YES), then the program is assigned to multicast delivery (block 440). For example, content management system 205 assigns the program to multicast delivery for users.

In block 450, it is determined whether there is another program. For example, content management system 205 determines whether another program in the program schedule needs to be evaluated for popularity and assigned a delivery method. If it is determined that there is another program (block 450—YES), then process 400 continues to block 410. If it is determined that there is not another program (block 450—NO), then network resources are analyzed (block 455). For example, content management system 205 determines whether there are sufficient network resources to multicast the selected programs. For example, content management system 205 analyzes the network resource data. The network resource data may be network-specific. For example, the network resource data may pertain to content delivery network 105. In the event that there are not sufficient network resources to support the multicast of one or multiple programs, content management network 205 may select another network to multicast the program, such as mobile network 153. Depending on the outcome of the analysis, in a degenerative case, content management network 205 may, ad hoc, reassign the least popular, multicast program(s) to be unicasted when there are insufficient network resources to multicast the program and there are sufficient network resources to unicast the program. Alternatively, content management network 205 requests a change in the program schedule. A program scheduler may change the program schedule so that sufficient network resources are available to accommodate the multicasting of the selected programs during a particular time period.

In block 460, the selected programs are multicasted. For example, content devices (e.g., program servers 215) multicast the selected programs. The programs are multicasted based on the program schedule.

Although FIG. 4 illustrates an exemplary program distribution process 400, according to other embodiments, process 400 may include additional operations, fewer operations, and/or different operations than those illustrated in FIG. 4 and described. For example, according to other embodiments, content device 110 may receive a catalog or a list of programs without scheduling information. Content device 110 determines popularity for each program and assigns each program to a method of delivery based on the popularity. Based on network resource data, content device 110 generates a program schedule. Additionally, as previously described, as programs are multicasted or unicasted, content devices 140 may store programs and offer program sharing services. Additionally, users may view programs that are multicasted and unicasted using various user devices.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 4, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 305, etc.), or a combination of hardware and software (e.g., software 315). The embodiments have been described without reference to the specific software code since the software code can be designed to implement the embodiments based on the description herein and commercially available software design environments/languages.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 305) of a computational device. A non-transitory storage medium includes one or more of the storage mediums described in relation to memory/storage 310.

No element, act, or instruction described in the present application should be construed as critical or essential to the embodiments described herein unless explicitly described as such.

What is claimed is:

1. A method comprising:
    receiving, by a network device, data that indicates programs available to users, wherein the programs include linear television programs, video-on-demand programs, and pay-per-view programs;
    determining, by the network device, a popularity value for each program, wherein for at least one of the programs, the determining comprises:
        calculating a probability of popularity value; and
        mapping the probability of popularity value to the popularity value;
    comparing, by the network device, each popularity value with a threshold popularity value;
    determining, by the network device, whether each popularity value satisfies the threshold popularity value based on the comparing;
    assigning, by the network device, each program associated with each popularity value that satisfies the threshold popularity value to multicast delivery based on determining that the popularity value of the program satisfies the threshold popularity value, wherein one or more programs assigned to multicast delivery include one or more of a video-on-demand program or a pay-per-view program;
    assigning, by the network device, each program associated with each popularity value that does not satisfy the threshold popularity value to unicast delivery based on determining that the popularity value of the program does not satisfy the threshold popularity value, wherein one or more programs assigned to unicast delivery include one or more of a video-on-demand program, a pay-per-view program, or a linear television program;
    multicasting each program assigned to multicast delivery; and
    unicasting each program assigned to unicast delivery.

2. The method of claim 1, wherein determining the popularity value further comprising:
    calculating the popularity value based on user viewership data, demographic data pertaining to users, and prediction data that indicates an amount of advertisement for the program.

3. The method of claim 1, wherein the assigning each program associated with each popularity value that does not satisfy the threshold popularity value to unicast delivery comprises:
    evaluating network resource data and administrative configurations to use available network resources pertaining to a network;
    determining whether there are sufficient network resources of the network to support the unicasting of each program assigned to unicast delivery based on the evaluating; and
    assigning unicast delivery for one or more programs via Internet based on determining that there are not sufficient network resources of the network to support the unicasting of each program assigned to unicast delivery.

4. The method of claim 1, wherein the assigning comprises:
    evaluating network resource data and administrative configurations to use available network resources pertaining to a network;
    determining whether there are sufficient network resources of the network to support the multicasting of each program assigned to multicast delivery based on the evaluating; and
    changing one or more programs from multicast delivery to unicast delivery, before the one or more programs are initially made available to the users for selection, when there are not sufficient network resources to support the multicasting of each program assigned to multicast delivery.

5. The method of claim 1, wherein the data includes a program schedule for the programs, and the method further comprising:
    determining the popularity value for each program based on the program schedule.

6. The method of claim 1, further comprising:
    receiving, by an in-home media device of a user network, the multicast of one of the programs multicasted; and
    storing, by the in-home media device, the one of the programs.

7. The method of claim 6, further comprising:
    distributing, by the in-home media device, the one of the programs to another in-home media device of another user network based on a program sharing service, wherein the one of the programs is a video-on-demand program or a pay-per-view program.

8. A network device comprising:
    a communication interface;
    a memory, wherein the memory stores instructions; and
    a processor, wherein the processor executes the instructions to:
        receive, via the communication interface, data that indicates programs available to users, wherein the programs include linear television programs, video-on-demand programs, and pay-per-view programs;
        determine a popularity value for each program, wherein a determination of the popularity value for at least one of the programs comprises:
            calculate a probability of popularity value; and
            map the probability of popularity value to the popularity value;
        compare each popularity value with a threshold popularity value;
        determine whether each popularity value satisfies the threshold popularity value based on the comparison;

assign each program associated with each popularity value that satisfies the threshold popularity value to multicast delivery based on a determination that the popularity value of the program satisfies the threshold popularity value, wherein one or more programs assigned to multicast delivery include one or more of a video-on-demand program or a pay-per-view program; and assign each program associated with each popularity value that does not satisfy the threshold popularity value to unicast delivery based on a determination that the popularity value of the program does not satisfy the threshold popularity value, wherein one or more programs assigned to unicast delivery include one or more of a video-on-demand program, a pay-per-view program, or a linear television program.

9. The network device of claim 8, wherein, when determining the popularity value, the processor further executes the instructions to:
use a program schedule pertaining to each program to determine the popularity value.

10. The network device of claim 8, wherein, when assigning each program associated with each popularity value that does not satisfy the threshold popularity value to unicast delivery, the processor further executes the instructions to:
evaluate network resource data and administrative configurations to use available network resources pertaining to a network;
determine whether there are sufficient network resources of the network to support the unicasting of each program assigned to unicast delivery based on the evaluation; and
assign unicast delivery for one or more programs via Internet based on a determination that there are not sufficient network resources of the network to support the unicasting of each program assigned to unicast delivery.

11. The network device of claim 8, wherein the processor further executes the instructions to:
evaluate network resource data and administrative configurations to use available network resources pertaining to a network;
determine whether there are sufficient network resources of the network to support the multicasting of each program assigned to multicast delivery based on the evaluation; and
change one or more programs from multicast delivery to unicast delivery, before the one or more programs are initially made available to the users for selection, when there are not sufficient network resources to support the multicasting of each program assigned to multicast delivery.

12. The network device of claim 8, wherein the data includes a program schedule that includes date, day, and time data pertaining to a schedule for each program, and the processor further executes the instructions to:
determine the popularity value for each program based on the program schedule, wherein the date, day, and time data are used to determine the popularity value.

13. The network device of claim 8, wherein, when determining the popularity value for one or more of the programs, the processor further executes the instructions to:
calculate the popularity value based on user viewership data, demographic data pertaining to users, and prediction data that indicates an amount of advertisement for a program.

14. The network device of claim 8, wherein the processor further executes the instructions to:
assign a program associated with a popularity value that satisfies the threshold popularity value also to unicast delivery based on the determination that the popularity value of the program satisfies the threshold popularity value.

15. The network device of claim 8, wherein the processor further executes the instructions to:
provide that each program assigned to multicast delivery is multicasted to users.

16. A non-transitory, computer-readable storage medium storing instructions executable by a processor of a computational device, which when executed cause the computational device to:
receive data that indicates programs available to users, wherein the programs include linear television programs, video-on-demand programs, and pay-per-view programs;
determine a popularity value for each program, wherein a determination of the popularity value for at least one of the programs comprises:
calculate a probability of popularity value; and
map the probability of popularity value to the popularity value;
compare each popularity value with a threshold popularity value;
determine whether each popularity value satisfies the threshold popularity value based on the comparison;
assign each program associated with each popularity value that satisfies the threshold popularity value to multicast delivery based on a determination that the popularity value of the program satisfies the threshold popularity value, wherein one or more programs assigned to multicast delivery include one or more of a video-on-demand program or a pay-per-view program; and
assign each program associated with each popularity value that does not satisfy the threshold popularity value to unicast delivery based on a determination that the popularity value of the program does not satisfy the threshold popularity value, wherein one or more programs assigned to unicast delivery include one or more of a video-on-demand program, a pay-per-view program, or a linear television program.

17. The non-transitory, computer-readable storage medium of claim 16, further storing instructions executable by the processor of the computational device, which when executed cause the computational device to:
sort the programs based on a partitioning of a network according to a particular type of node.

18. The non-transitory, computer-readable storage medium of claim 17, further storing instructions executable by the processor of the computational device, which when executed cause the computational device to:
evaluate network resource data and administrative configurations to use available network resources pertaining to a network;
determine whether there are sufficient network resources of the network to support the unicasting of each program assigned to unicast delivery based on the evaluation; and
assign unicast delivery for one or more programs via Internet based on a determination that there are not sufficient network resources of the network to support the unicasting of each program assigned to unicast delivery.

19. The non-transitory, computer-readable storage medium of claim 16, further storing instructions executable by the processor of the computational device, which when executed cause the computational device to:
- evaluate network resource data and administrative configurations to use available network resources pertaining to a network;
- determine whether there are sufficient network resources of the network to support the multicasting of each program assigned to multicast delivery based on the evaluation; and
- change one or more programs from multicast delivery to unicast delivery, before the one or more programs are initially made available to the user for selection, when there are not sufficient network resources to support the multicasting of each program assigned to multicast delivery.

20. The non-transitory, computer-readable storage medium of claim 16, further storing instructions executable by the processor of the computational device, which when executed cause the computational device to:
- assign a program associated with a popularity value that satisfies the threshold popularity value also to unicast delivery based on the determination that the popularity of the program satisfies the threshold popularity value.

* * * * *